(12) United States Patent
Verbeck, IV

(10) Patent No.: US 11,906,403 B2
(45) Date of Patent: Feb. 20, 2024

(54) MOLECULE COLLECTION DEVICES AND SYSTEM FOR ENVIRONMENT MONITORING

(71) Applicant: University of North Texas, Denton, TX (US)

(72) Inventor: Guido Fridolin Verbeck, IV, Lewisville, TX (US)

(73) Assignee: University of North Texas, Denton, TX (US)

( * ) Notice: Subject to any disclaimer, the term of this patent is extended or adjusted under 35 U.S.C. 154(b) by 136 days.

(21) Appl. No.: 17/536,293

(22) Filed: Nov. 29, 2021

(65) Prior Publication Data

US 2022/0170828 A1    Jun. 2, 2022

Related U.S. Application Data

(60) Provisional application No. 63/119,585, filed on Nov. 30, 2020.

(51) Int. Cl.
| | | |
|---|---|---|
| *G01N 1/22* | (2006.01) | |
| *G01N 1/26* | (2006.01) | |
| *B01J 20/28* | (2006.01) | |
| *G01N 21/3504* | (2014.01) | |
| *B01J 20/26* | (2006.01) | |
| *G01N 1/40* | (2006.01) | |

(52) U.S. Cl.
CPC ............ *G01N 1/2273* (2013.01); *B01J 20/26* (2013.01); *B01J 20/28033* (2013.01); *G01N 1/26* (2013.01); *G01N 1/405* (2013.01); *G01N 21/3504* (2013.01)

(58) Field of Classification Search
CPC ........................................................ G01N 1/26
See application file for complete search history.

(56) References Cited

U.S. PATENT DOCUMENTS

2014/0227795 A1 *   8/2014   Belbruno ............. G01N 27/126
427/596

FOREIGN PATENT DOCUMENTS

JP          2014106108       *   6/2014

* cited by examiner

*Primary Examiner* — Jamel E Williams
*Assistant Examiner* — Alex T Devito
(74) *Attorney, Agent, or Firm* — Norton Rose Fulbright US LLP

(57) ABSTRACT

The present disclosure provides a system, method, and apparatus for detecting chemical effluents in an environment using Teslin substrates. To illustrate, a system includes one or more Teslin substrates which can capture molecules present in an ambient environment. The system includes a housing with the one or more Teslin substrates disposed within the housing. The system further includes means for selectively exposing different portions of the one or more Teslin substrates to the ambient environment, in which the molecules present in the ambient environment are captured by the different portions of the one or more Teslin substrates as the different portions of the one or more Teslin substrates are exposed. The system can include that the means for selectively exposing different portions of the one or more Teslin substrates is an aperture in the housing.

20 Claims, 16 Drawing Sheets

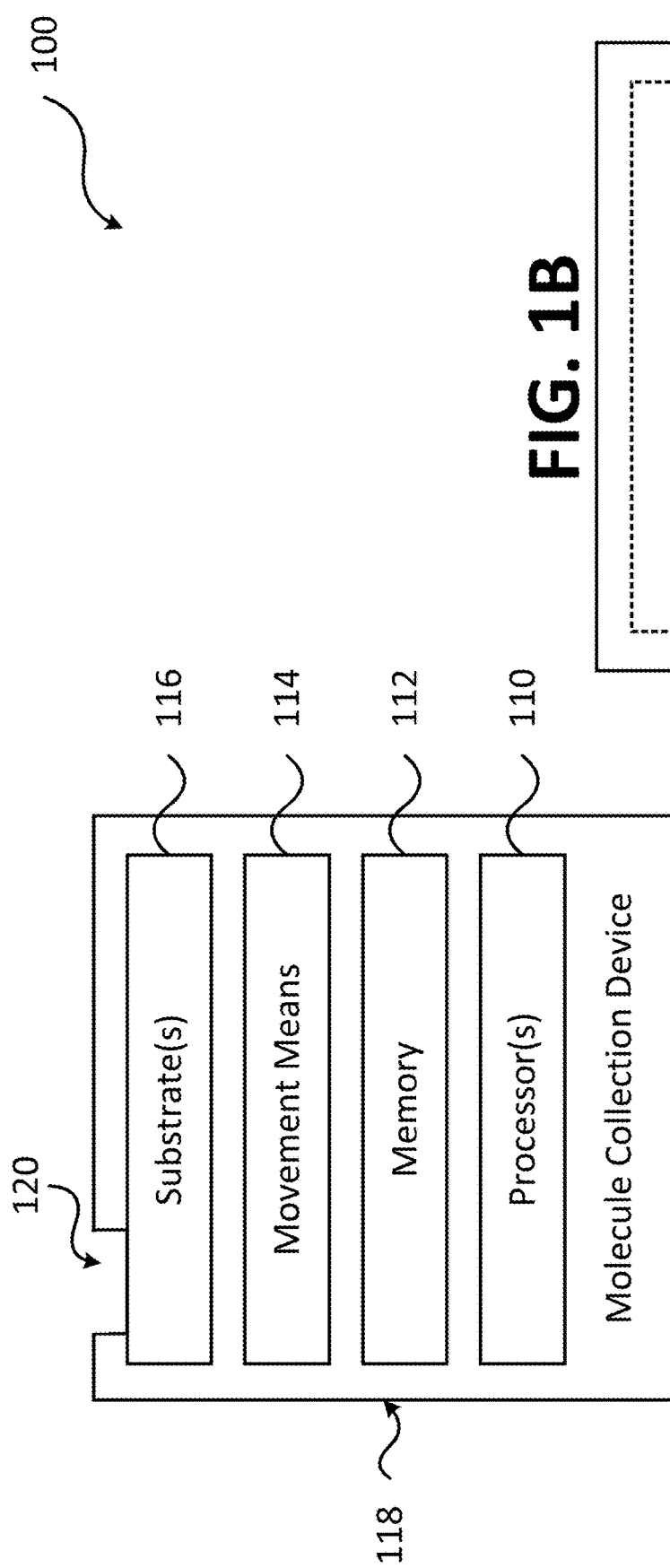
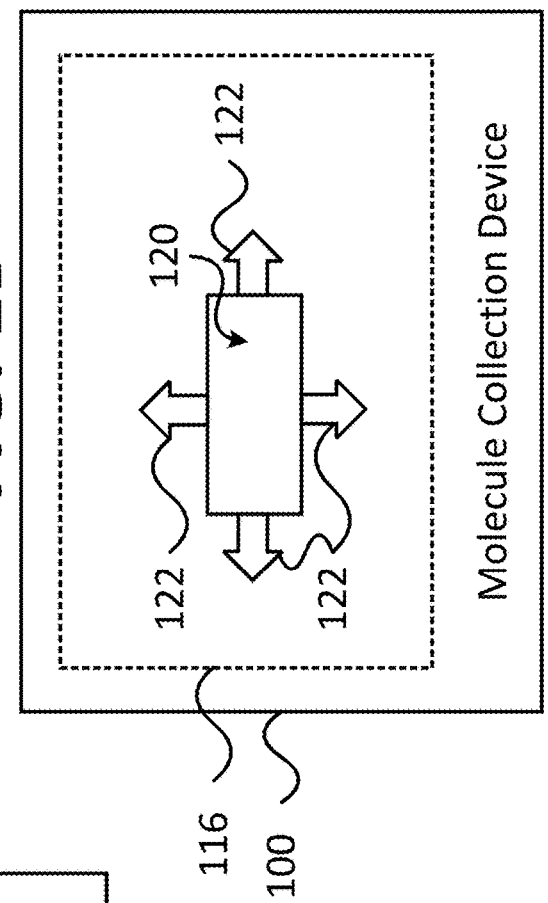

MOLECULE COLLECTION DEVICES AND SYSTEM FOR ENVIRONMENT MONITORING

CROSS-REFERENCE TO RELATED APPLICATIONS

The present application claims the benefit of the filing date of U.S. Provisional Application No. 63/119,585 filed Nov. 30, 2020 and entitled "MOLECULE COLLECTION DEVICES AND SYSTEM FOR ENVIRONMENT MONITORING," the disclosure of which is incorporated by reference herein in its entirety.

TECHNICAL FIELD

The present application is generally related to the field of molecular analysis and more specifically to systems and methods for capturing and analyzing multiple samples of molecules present in an ambient environment.

BACKGROUND

Air and environmental pollution is a widespread problem with significant risks to human health. Some factors contributing to the increasing problem of pollution and health risks include damage to the atmosphere, increased population growth in urban areas, chemical manufacturing and related activities (e.g., disposal), and airborne illnesses. Indoor air quality also suffers from the factors affecting the environment in buildings such as homes, schools, hospitals, and workplaces, which are heavily frequented in urban areas and therefore high risk for contributing to human health problems. As an example, poor or inadequate indoor air quality can cause breathing problems and other long-term severe medical conditions. Some harmful pollutants that can affect indoor environments include chemical gases and effluents generated from fossil fuel combustion-related activities. In urban areas, these pollutants are mainly emitted from on-road and off-road vehicles, but there are also contributions from power plants, industrial boilers, incinerators, and petrochemical plants, to name a few examples. Additionally, urban areas may have multiple cross border sources of pollution due to prevailing winds. A major factor of urban indoor air quality is city design with air dispersion capabilities, based on the building location, building density to the road width ratios and traffic congestion in different peak hours during the day.

The environmental pollutants and other dangerous public health concerns are detectable via molecules present in an environment. Detecting the relevant molecules in an indoor air system would greatly contribute to the safety of the building occupants and would also be useful for finding a better solution for a good urban design to alleviate the problems of air pollutant accumulation.

Current methods of determining air quality include direct methods of analysis, which do not have part per million or part per billion sensitivity to air sampling and also to do not have the ability to focus on a particular type of chemical effluent such as chemical weapons, drugs, air pollution, or airborne viruses. One such example is using Paper Spray Mass Spectrometry with filter paper. Molecules can be difficult to detect with the filter paper, which generates a lot of noise on the reading due to impurities in the paper. Additionally, mass spectrometry devices are often very heavy and are difficult to move in an environment, limiting the mobility of such systems and the areas where they may be deployed.

SUMMARY

Molecule collection and analysis systems according to embodiments of the present disclosure utilize a substrate to capture samples of molecules present in an environment. The substrate may be formed in one or more layers from microporous polyolefin-silica matrices that allow for absorption of chemical substances with little to no noise to distort the reading and provide a durable and waterproof platform for collecting molecule samples from environments. The substrate may be tunable to capture a particular molecule or type of molecules of interest, thereby providing a mechanism for minimizing noise introduced during sample collection and limiting the molecules collected during sampling of an environment to particular molecules of interest, such as molecules associated with components of chemical weapons, drugs, air pollution, airborne viruses, and the like. "Teslin" is a registered trademark of PPG Industries Ohio, Inc. (referred to hereinafter as either Teslin® or simply Teslin), and Teslin substrates are microporous polyolefin-silica matrices. In an aspect, the substrate may be formed from Teslin substrate, which is not presently known or used for molecule collection—instead, Teslin is presently used predominately to produce driver licenses and other forms of identification or documentation because of its ability to hold ink.

The systems and methods of the present disclosure provide for detecting one or more molecules or chemical effluents in an environment in a controlled manner. In an aspect, different portions of the substrate may be exposed to an environment for a period of time, thereby capturing at least some molecules of interest (if present in the environment at the time of capture). This enables the disclosed systems and methods to generate time-sequenced samples of the molecules present in an environment in a more efficient manner than prior systems and with improved accuracy (e.g., due to reduced noise caused by the tuning of the substrate to the molecules of interest).

In an aspect, a system for detecting one or more chemical effluents in an environment may include one or more substrates, a housing, and a means for selectively exposing different portions of the one or more substrates to the ambient environment. The one or more substrates may be disposed within the housing. As the different portions of the one or more substrates are exposed to the ambient environment, any molecules of interest (e.g., molecules corresponding to those for which the substrate is tuned) that are present in the ambient environment may be captured by the exposed portion of the one or more substrates. As described above, the one or more substrates may be tuned or configured to capture particular molecules of interest present in an ambient environment. Thus, the one or more substrates may include different substrates, each tuned to a different set of one or more molecules, thereby enabling monitoring and detection of multiple different molecules to be performed simultaneously, each molecule (or set of molecules) captured by a different one of the one or more substrates.

In some instances, the system can further include one or more apertures disposed on a surface of the housing. In order to expose different portions of the one or more substrates, either the one or more apertures may be moved or the substrates may be moved. According to one embodiment, the means for selectively exposing the different portions of the one or more substrates to the ambient environment may be configured to move the one or more apertures relative to the one or more substrates to expose the different portions of the one or more substrates to the ambient environment via the one or more apertures. According to another embodiment, the means for selectively exposing the different portions of the one or more substrates to the ambient environment may be configured to move the one or more substrates relative to the one or more apertures to expose the different portions of the one or more substrates to the ambient environment via the one or more apertures.

Further, whether the different portions of the substrates are exposed by moving the aperture or the substrates, the portions may be exposed in non-limiting examples via movement by a motor or by hand. As an example, according to another embodiment, the means for selectively exposing the different portions of the one or more substrates to the ambient environment may include a motor configured to move a surface of the housing, such as a surface where the one or more apertures are disposed, and wherein movement of the surface of the housing exposes the different portions of the one or more substrates to the ambient environment. As another example, the means for selectively exposing the different portions of the one or more substrates to the ambient environment may include a motor configured to move the one or more substrates relative to an aperture disposed on a surface of the housing, where the ambient environment is exposed to the different portions of the one or more substrates via movement of the one or more substrates relative to the aperture. According to yet another embodiment, the means for selectively exposing the different portions of the one or more substrates to the ambient environment may include a motor configured to move a surface of the housing (e.g., a surface upon which the one or more apertures are disposed) to expose the different portions of the one or more substrates to the ambient environment.

In some instances, the system may also include a vehicle. The vehicle can be used to transport a device carrying the one or more substrates over a large area, which may include different environments. The vehicle may be a land-based vehicle, an aquatic vehicle, an aerial vehicle, another type of vehicle, or combinations thereof. Exemplary vehicles suitable for transporting the device carrying the one or more substrates may include cars, trucks, vans, bicycles, motorcycles, trains, buses, amphibicar (e.g., a vehicle that can travel on land and water), boats, ships, yachts, submarines, helicopters, airplanes, drones, quadcopters, or hot air balloons. In an aspects, the means for selectively exposing the different portions of the one or more substrates to the ambient environment may expose the different portions of the one or more substrates to the ambient environment as the vehicle moves through a geographic environment(s). For example, the vehicle may travel to different locations within a city and at each location a different portion of the one or more substrates may be exposed to the ambient environment, thereby enabling sampling of those locations for one or more molecules of interest.

In some instances, the system can additionally include a reading device configured to analyze the one or more substrates and determine whether the one or more molecules are present in the ambient environment. The system may be configured to provide a report or other form of output based on whether the molecule(s) of interest were detected. In one non-limiting example, the reading device is a mass spectrometer. In another example, the reading device may be an infrared spectrometer. By incorporating a reading device, embodiments of the present disclosure may enable more rapid identification of molecules of interest as compared to traditional techniques where samples are sent to a lab or other location where analysis takes place.

As briefly described above, the one or more substrates can be pre-conditioned or tuned to accept or capture specific chemistry of an environment. By utilizing multiple substrates, different molecules may be captured. In some instances, the one or more substrates may be configured to capture organic functional groups, such as aromatic molecules, which are present in precursors to chemical weapons.

In some embodiments, the one or more substrates may be in a stationary form factor, rather than mounted to vehicle. For example, the housing may be placed in an environment and the different portions of the substrate(s) can be exposed to the environment (e.g., via the means for selectively exposing the different portions of the one or more substrates to the ambient environment) over time. Such embodiments may be used to monitor the air in an environment, such as a building, continually or periodically. In some implementations, this system can be mounted on to a wall of a building or may be placed at a particular location (e.g., a desk, a shelf, etc.). According to some embodiments, the system can be placed closer to the air vents of the building to get a better reading of the total environment.

The foregoing has outlined rather broadly the features and technical advantages of the present disclosure in order that the detailed description of the invention that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which:

FIG. 1A is a block diagram illustrating a molecule collection device according to aspects of the present disclosure;

FIG. 1B is a block diagram illustrating a molecule collection device according to aspects of the present disclosure;

DETAILED DESCRIPTION OF THE INVENTION

Figure 2:
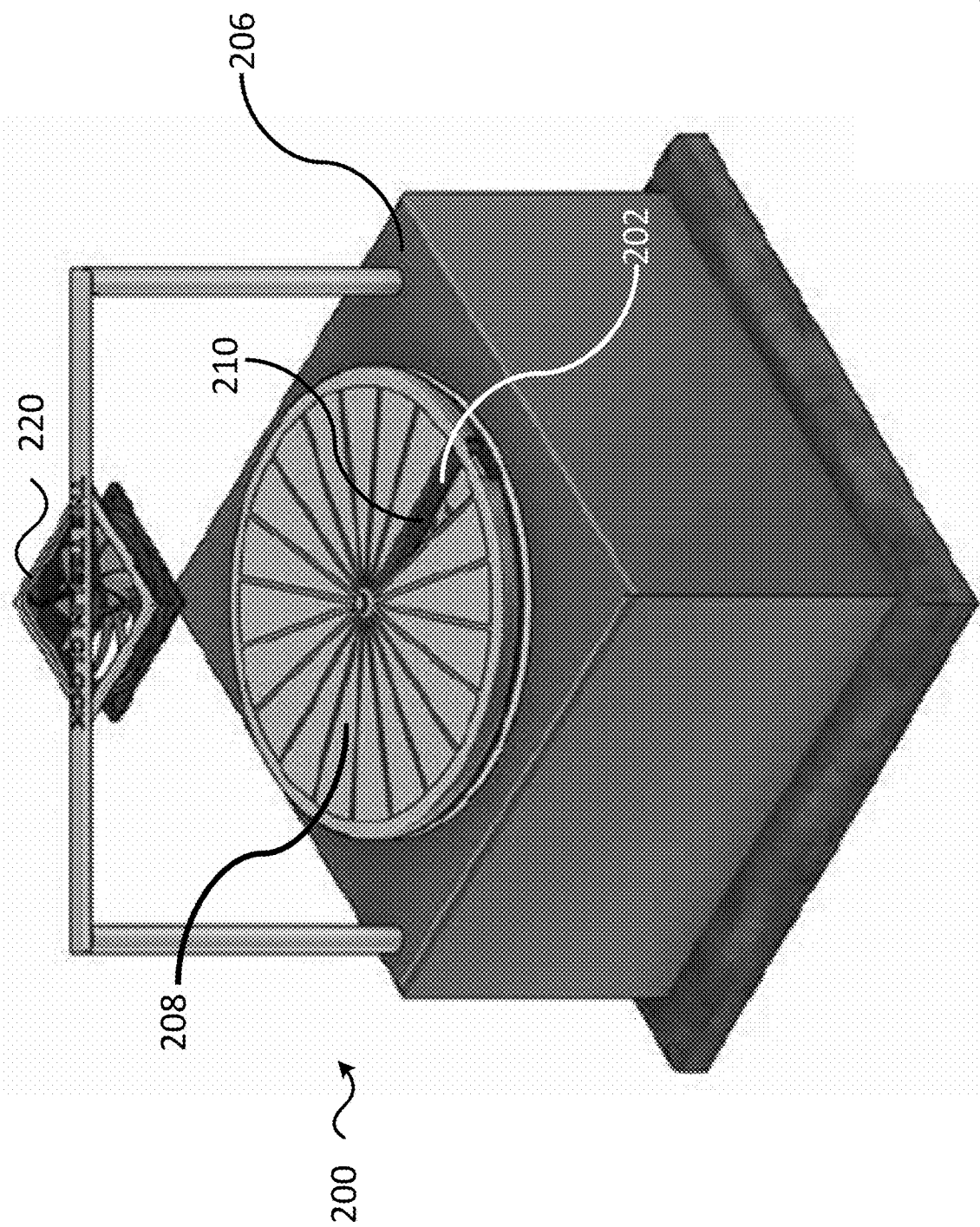
FIG. 2 is a block diagram illustrating a molecule collection device according to aspects of the present disclosure.

Referring to FIGS. 1A and 1B, block diagrams illustrating a molecule collection device according to aspects of the present disclosure are shown as a molecule collection device 100. As shown in FIG. 1A, the molecule collection device 100 may include one or more processors 110, a memory 112, movement means 114, and one or more substrates 116. Each of the one or more processors 110 may include a central processing unit (CPU), a microcontroller, an application specific integrated circuit (ASIC), a field programmable gate array (FPGA), or other logic and circuitry configured to control operations of the molecule collection device 100 in accordance with aspects of the present disclosure. The memory 112 may include read only memory (ROM) devices, random access memory (RAM) devices, one or more hard disk drives (HDDs), flash memory devices, solid state drives (SSDs), network attached storage (NAS) devices, other devices configured to store data in a persistent or non-persistent state, or a combination of different memory devices. The memory 112 may store instructions that, when executed by the one or more processors 110, cause the one or more processors 110 to perform the operations described in connection with the molecule collection device 100.

Figure 5:
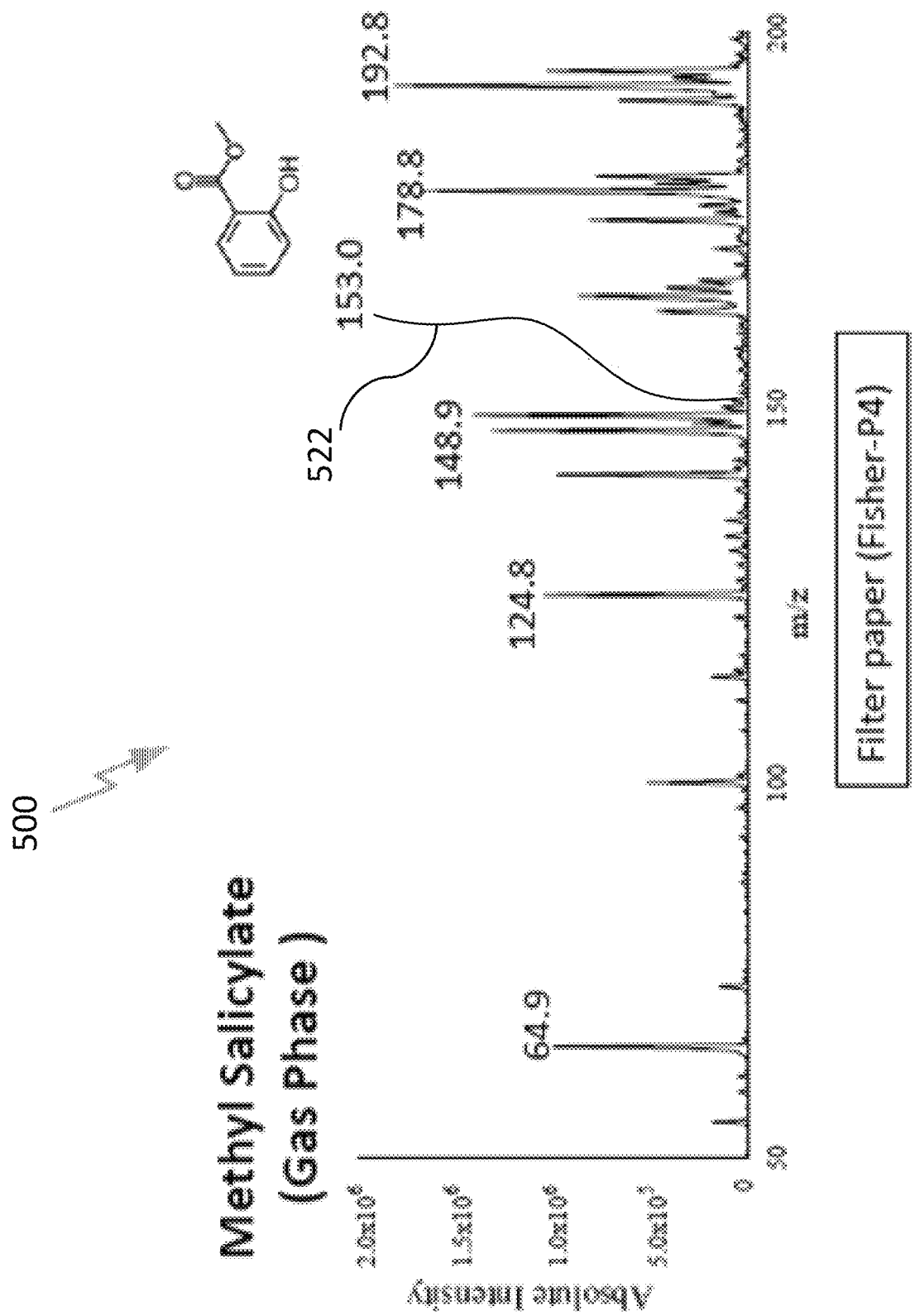
FIG. 5 is a graph of the absolute intensity readings from a mass spectrometer of molecules captured on filter paper exposed to an environment containing methyl salicylate gas.

The one or more substrates 116 may be formed from Teslin and utilized to capture molecules present in an environment in which the molecule collection device 100 is operating. Utilization of Teslin substrates according to embodiments of the present disclosure provides several advantages as compared to previous molecule collection systems that utilized paper-based substrates (e.g., filter paper, etc.) to capture molecules. For example and referring to FIG. 5, a graph of the absolute intensity readings from a mass spectrometer of molecules captured on filter paper (e.g., paper traditionally used for molecular analysis) exposed to an environment containing methyl salicylate gas is shown and designated 500. Graph 500 illustrates peaks that identify molecules captured by the filter paper. The graph indicates that a significant amount of noise was captured by the filter paper, shown as peaks associated with impurities present in the filter paper instead of the environment in which the testing was done. Reference 522 points to a line identifying the peak associated with methyl salicylate and having a corresponding value of 153.0. However, as illustrated in FIG. 5, graph 500 includes numerous other peaks (e.g., peaks having values of 64.9, 100, 124.8, 148.9, 178.8, and 192.8) corresponding to impurities and chemicals present in the filter paper rather than the ambient environment. Notably, the peaks associated with the chemicals present in the filter paper are more prominent (i.e., larger magnitude) and overpower the peak associated with methyl salicylate.

Figure 6:
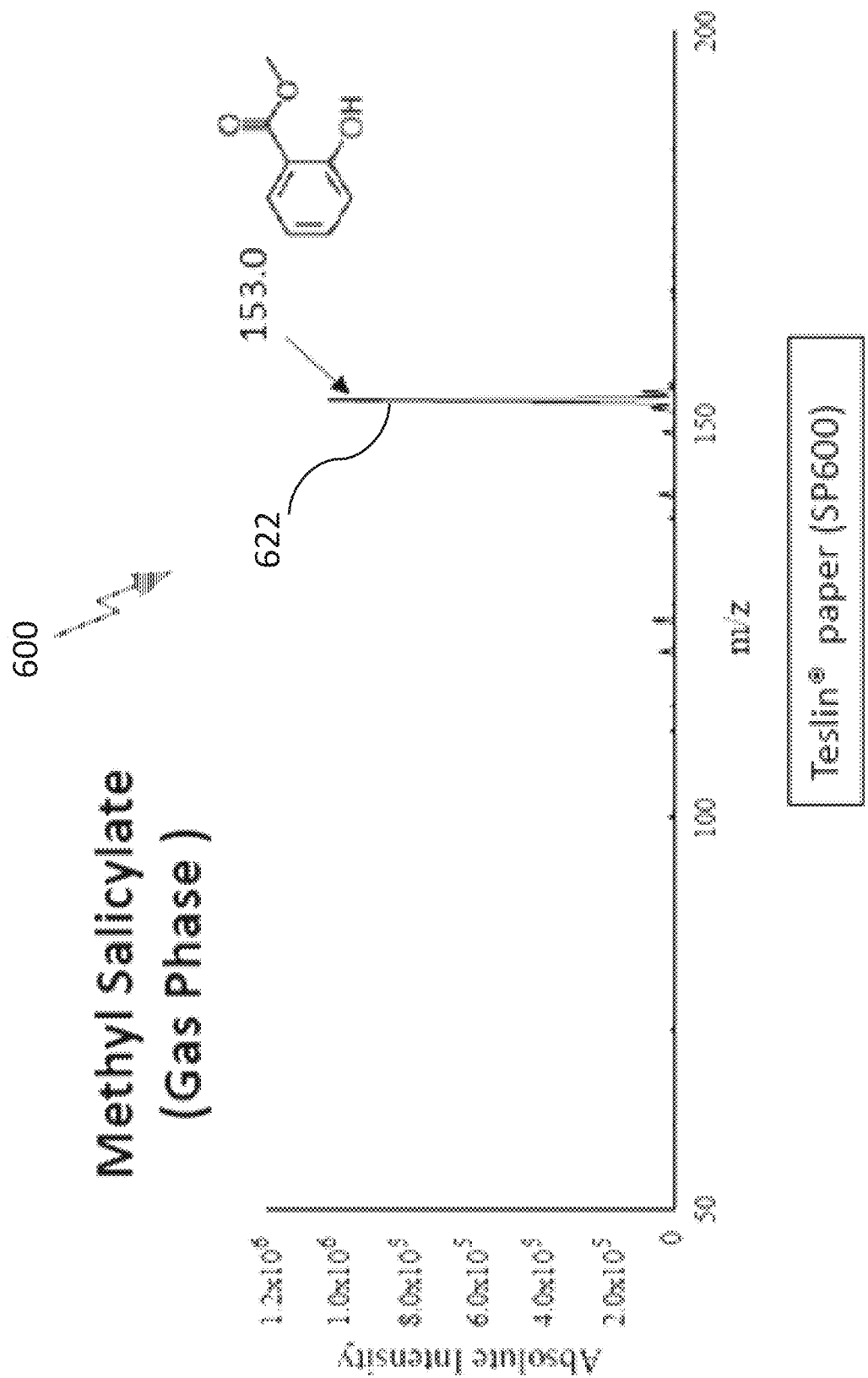
FIG. 6 is a graph of the absolute intensity readings from a mass spectrometer of molecules captured on a Teslin substrate exposed to an environment containing methyl salicylate gas.

In contrast to graph 500 of FIG. 5, and referring to FIG. 6, a graph of the absolute intensity readings from a mass spectrometer of molecules captured on a Teslin substrate (e.g., the substrate 116 of FIGS. 1A, 1B) exposed to an environment containing methyl salicylate gas is shown and designated 600. It is noted that the graphs 500 and 600 were captured in the same ambient environment, where the filter paper and the Teslin substrate were placed in a sealed container having a quantity of methyl salicylate. Graph 600 illustrates that the Teslin substrate did not include the large amount of noise present in the graph 500 associated with the filter paper. Reference 622 points to the corresponding peak value 153.0 indicating the presence of methyl salicylate. Moreover, the peak at 153 is more easily identified in graph 600 as compared to the graph 500, which is noisy due to the impurities and chemicals present in the filter paper. As shown in FIGS. 5 and 6, the Teslin substrate results in significantly less noise as compared to the use of filter paper (or other paper-based substrates) and may allow more accurate readings of molecules present in an environment.

Referring back to FIG. 1, the molecule collection device 100 may be used to capture samples of molecules present in an environment in which the molecule collection device 100 is located. To facilitate exposure of the one or more substrates 116 to the environment, the housing 118 may include an aperture(s) 120 that exposes a portion of the one or more substrates 116 to the environment. As illustrated in FIG. 1B, the aperture 120 may be moveable, as indicated by arrows 122, to expose different portions of the substrate(s) 116 to the environment and allow molecules present in the environment to be captured on the substrate(s) 116. Movement of the aperture 120 may be facilitated by the movement means 114 (also referred to herein as a means for selectively exposing different portions of the one or more substrates to an ambient environment), which may include motors (e.g., stepper motors, etc.), gears, or other devices and components configured to move the aperture 120 such that different portions of the one or more substrates 116 are exposed to the environment in which the molecule collection device 100 is operating. It is noted that in some aspects the aperture 120 may be stationary and the one or more substrates 116 may be moved relative to the aperture 120 instead of moving the aperture 120 relative to the one or more substrates. In such an embodiment, the movement means 114 may use gears, motors, etc. to move the one or more substrates 116. Additionally, it is noted that the movement means may be configured to move the aperture 120, the one or more substrates 116, or both, in increments (e.g., using steps of a stepper motor, etc.) in 2D space or may be configured to facilitate rotational movement of the aperture 120 and/or the one or more substrates 116. Moreover, it is noted that in some aspects the exposure may be facilitated by non-motorized movement of the aperture 120, the substrate(s) 116, or both, such as by a user moving (e.g., sliding, rotating, etc.) a surface of the housing 118 (e.g., a surface on which the aperture 120 is located) to move the aperture 120 relative to the substrate(s) 116, or moving (e.g., sliding, rotating, etc.) a plate or other device on which the substrate(s) 116 is mounted to move the substrate(s) 116 relative to the aperture 120.

Although not shown in FIGS. 1A and 1B, in some aspects, the molecule collection device 100 may be incorporated into a system that includes a device configured to determine the molecules present in the environment in which the molecule collection device 100 is operating based on the molecules captured by the one or more substrates 116. For example, the system may include reading device, such as a mass spectrometer, infrared spectrometer, or other device capable of identifying molecules captured on the one or more substrates 116. In an aspect, the different portions of the substrate(s) 116 may represent different points in time, different geographic locations, or other manners of identifying the time/location associated with the chemistry captured by the one or more substrates 116. For example, the aperture 120 may be located at a first position relative to the substrate at a first time (e.g., time (t)=0) and may be located at a second position relative to the substrate at a second time (e.g., time (t)=1). Time (t)=0 may be associated with a first time and location and time (t)=1 may be associated with a second time and location. In an aspect, the location associated with time (t)=0 and time (t)=1 may be the same location. The reading device may analyze the molecules captured by the one or more substrates to identify molecules present in the ambient environment or determine whether particular molecules of interest (e.g., molecules for which the substrate has been tuned to capture) are present in the ambient environment. Based on the analysis, an output may be generated, such as a report or other types of output, that includes information associated with the identified molecules detected by the reading device. The output may be transmitted to a user over a network, such as via an e-mail message, a text message, or another form of communication. Additionally or alternatively, system may include a display device and the output may be presented at the display device. An audible or visual alert (e.g., sound, a flashing light, etc.) may be provided to inform a user that the output is available. Other techniques may also be utilized to generate outputs or reports associated with molecules detected by the reader device.

To illustrate, the molecule collection device 110 may be configured to monitor air quality (e.g., indoor air quality, outdoor air quality, etc.) at a particular location, such as a building. Thus, all samples of the environment may be associated with the position of the molecule collection device 100 at the building and the different portions of the one or more substrates 116 may indicate molecules captured at different points in time (e.g., over the course of an hour, multiple hours, a day, week, month, etc.). This may be advantageous because some buildings may have a greater potential for hazardous chemistry exposure, such as factories, government buildings, schools and hospitals closer to industrial sites, construction sites and highways, as compared to other buildings and sites (e.g., such as a building that is located distance from busy traffic ways, factories, etc.). The persons present in those buildings (e.g., employees, patients, children, etc.) may spend 80% of their time in the building and may be at risk of adverse health effects depending on the chemistry and molecules present in the air of the building. The ability to monitor air quality over time using the molecule collection device 100 of embodiments may enable the air quality to be evaluated and identify whether there are any times when those persons are more at risk due to poor air quality. In addition, locating and identifying chemical effluents in certain locations and specific time frames may allow governments and private companies to identify pre-set touch points to make accurate decisions with respect to mitigating harmful air chemistry that may impact persons associated with the environment being monitored by the molecule collection device 100. For example, where harmful air chemistry is caused by traffic at a traffic light, the monitoring may be used to control traffic and traffic movement (e.g., to mitigate the amount of time that vehicles spend producing exhaust that delivers harmful chemistry into the air) and plan alternate routes to minimize the traffic congestion and to diffuse the air pollutant accumulation around the building. Additionally, analysis of the chemistry present in the building may enable buildings to be improved with respect to their air ventilation and filtration systems to remove harmful molecules present in the environment, thereby improving the air quality for persons that spend significant amounts of time at those buildings.

Referring to FIG. 2, a diagram of a molecule collection device according to aspects of the present disclosure is shown as a molecule collection device 200. The molecule collection device 200 includes one or more substrates 202 (e.g., Teslin substrates), a housing 206, and means (not labelled in FIG. 2) for selectively exposing different portions of the one or more substrates to an ambient environment. In an aspect, the means for selectively exposing the different portions of the one or more substrates may include various components to expose a portion of the one or more substrates 202 to the environment. As described with reference to FIG. 1, the means for selectively exposing the one or more substrates may include a motor, gears, or other components configured to move the one or more substrates 202, an aperture 210, or both. In the implementation shown in FIG. 2, the one or more substrates 202 may be shaped to fit within the housing 206.

As an example, the molecule collection device shown in FIG. 2 is arranged in a clock-like configuration, where the aperture 210 is disposed on a circular disk 208 that may be rotated similar to a hand of a clock. As disk 208 is rotated, different portions of the one or more substrates 202 may be exposed to an ambient environment in which the clock is placed (e.g., as the aperture 210 rotates). The exposed portion of the one or more substrates 202 may be different over time due to rotation of the circular disk 208 and the aperture 210. It is noted that the rotation of the disk 208 and aperture 210 may be performed in discrete increments, such that the aperture 210 remains in a first position for a period of time (e.g., 1 hour, 3 hours, 1 day, 1 week, etc.), another non-overlapping portion of the one or more substrates 202 is exposed (e.g., via rotation of the disk 208 and aperture 210 or via rotation of the substrate(s) 210) for a second period of time, and so on. In some implementations, the means for selectively exposing different portions of the one or more substrates to an ambient environment may include a motor that may be configured to move the circular disk 208 and aperture 210 or another covering of the one or more substrates 202 to expose the different portions of the one or more substrates 202 over time. Alternatively, the motor may be configured to move the substrate(s) 210 to expose the different portions of the one or more substrates 202 to the ambient environment over time (e.g., via the aperture 210 of the disk 208). Furthermore, it is noted that manual control of the exposure of the different portions of the substrate(s) 202 may be utilized if desired (e.g., by a user manually rotating the disk 208 to expose different portions of the substrate(s) 202 via the aperture 210 or rotating the substrate(s) 202 instead). It is noted that while primarily described above as rotational movement, the movement of the substrates, aperture, or surface of the housing can be accomplished via translation, shifting, rotation, or any other form of movement which exposes a different portion of the substrate(s) to the ambient environment. As shown in FIG. 2, in some implementations a fan 220 may be provided to divert air towards the exposed surface of the one or more substrates 202, which may enable the molecule collection to occur more rapidly by directing air within the environment (and any molecules present therein) towards the aperture 210 for capture by the exposed portion of the substrate(s) 202.

Figure 3:
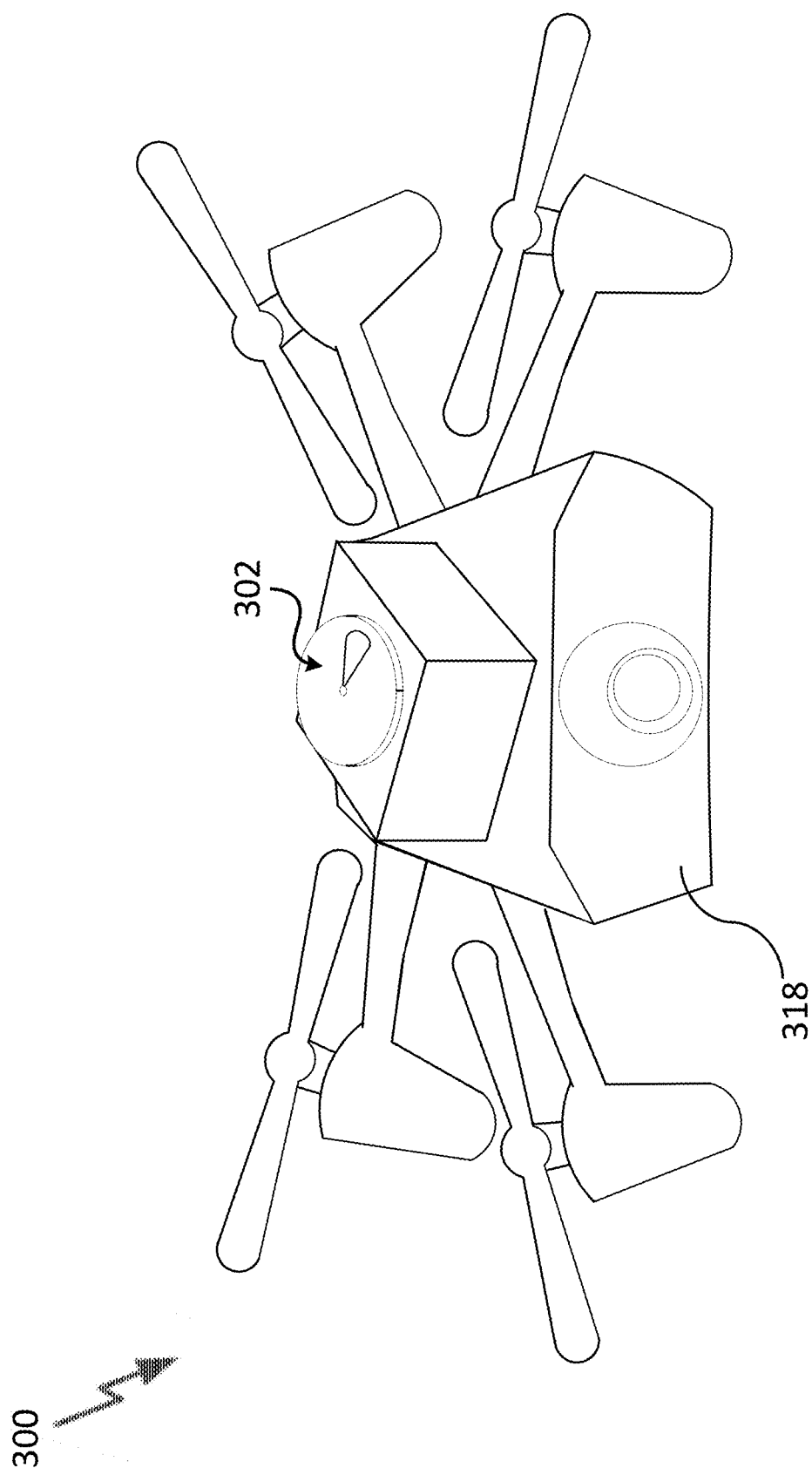
FIG. 3 is a block diagram illustrating a molecule collection system according to aspects of the present disclosure.

Referring to FIG. 3, a diagram of a molecule collection system in accordance with aspects of the present disclosure is shown as a system 300. System 300 includes a molecule collection device 302, which may be a molecule collection device similar to the molecule collection devices described and illustrated with reference to FIGS. 1 and 2, and a vehicle 318. In some implementations, the molecule collection device 302 can be mounted onto or affixed to the vehicle 318. In additional or alternative implementations, the molecule collection device 302 may be integrated within the vehicle 318, rather than simply mounted onto the vehicle 318. It is noted that FIG. 3 shows the vehicle 318 as a quad-copter for purposes of illustration, rather than by way of limitation. In embodiments, the vehicle 318 may be other types of vehicles, such as a land based vehicle (e.g., a car, truck, train, van, etc.), an aquatic vehicle (e.g., a boat, a submarine, etc.), or aerial vehicle (e.g., a drone, a plane, a helicopter, etc.). In embodiments where the molecule collection device 302 is integrated or attached to a vehicle, the different portions of the one or more substrates of the molecule collection device 302 may be associated with different geographic regions, rather than simply different points in time at a single location. For example, the vehicle 318 may travel to a first location and expose a first portion of the substrate(s) to the ambient environment for a period of time and then travel to a second location and expose a different portion of the substrate(s) to the ambient environment for a period of time. In this manner, rapid sampling of different geographic locations for molecules of interest may be performed, particularly where the molecule collection device 302 and/or the vehicle 318 is equipped with a reading device (e.g., the reading device described above).

Figure 4:
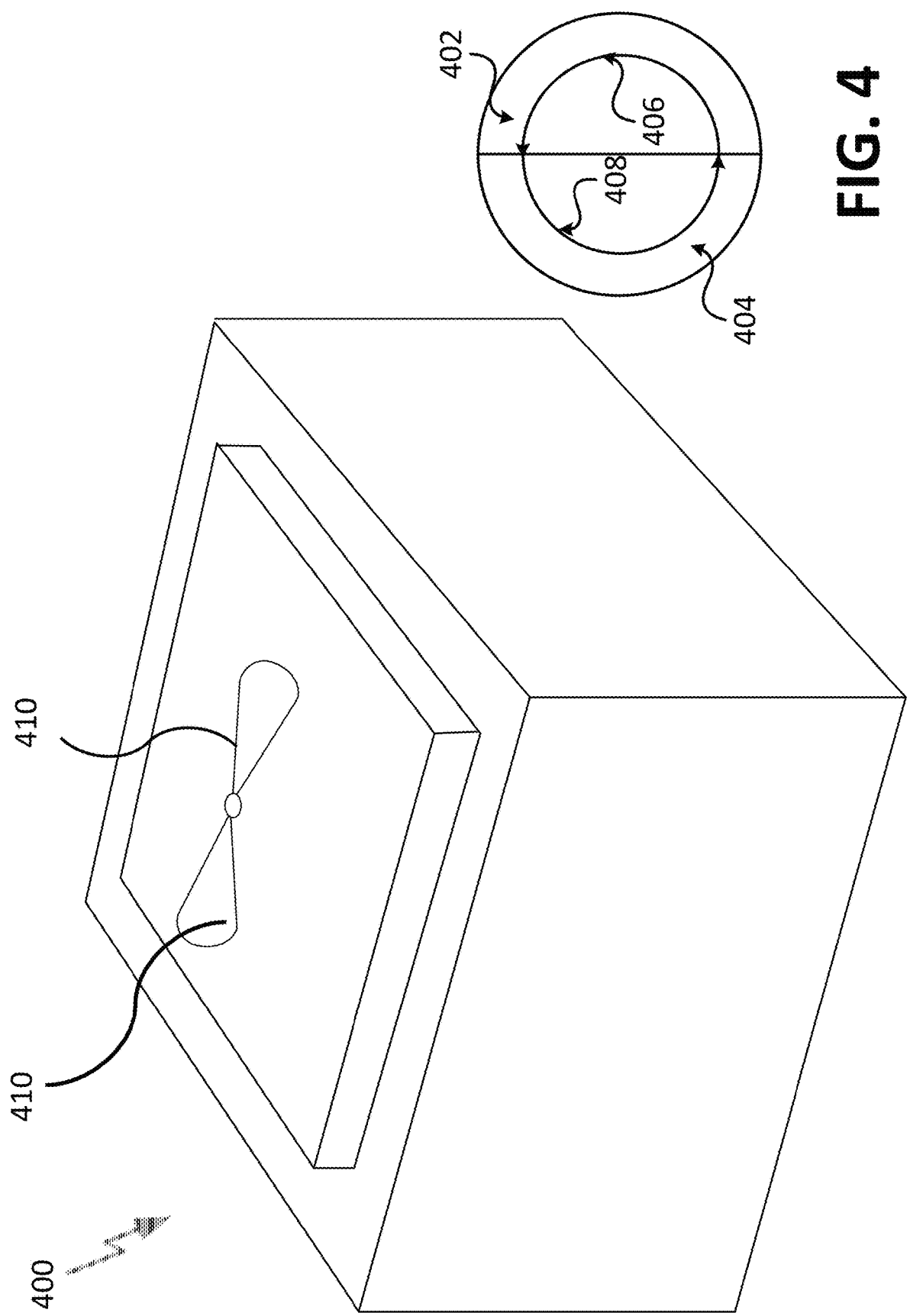
FIG. 4 is a block diagram illustrating additional features of a molecule collection device according to aspects of the present disclosure.

Referring to FIG. 4, a block diagram illustrating additional aspects of a molecule collection device in accordance with aspects of the present disclosure is shown as a molecule collection device 400. Molecule collection device 400 may include the components described and illustrated with reference to FIG. 1 or 2, but may include more than one aperture. For example, the molecule collection device 400 includes two apertures 410. The one or more substrates of the molecule collection device 400 may include two Teslin substrates 402, 404 or a single Teslin substrate having two different regions 402, 404. The Teslin substrate (or substrate region) 402 may be tuned to capture one or more first molecules and the Teslin substrate (or substrate region) 404 may be tuned to capture one or more second molecules, where the first and second molecules are different. A first one of the apertures 410 may be moved along the path shown by arrow 406 to capture samples of the first molecule(s) on the substrate (or substrate region) 402 and a second one of the apertures 410 may be moved along the path shown by arrow 408 to capture samples of the second molecule(s) on the substrate (or substrate region) 404. It is noted that while two apertures and Teslin substrates are shown in FIG. 4, embodiments of the present disclosure may include more than two apertures and more than two substrates in some implementations. Additionally, it is noted that multiple molecule collection devices, each having one or more substrates and/or apertures may be utilized by systems according to the present disclosure, thereby enabling collection of any number of molecules as may be desired for a particular use case to which embodiments of the present disclosure may be applied.

Furthermore, while FIGS. 2 and 4 illustrate exposure of different portions of the substrate(s) via rotational techniques, it is to be readily appreciated that linear techniques or other types of movements may be used to expose different portions of the substrate(s) to the ambient environment. Moreover, the substrate(s) may be shaped according to the type of movement techniques used for exposing the different regions. For example, circular substrates may be more suited for rotational movement techniques, as in the configuration shown in FIG. 2, but rectangular or square shaped substrates may be more suited for linear movement techniques (e.g., with different portions of the substrates being exposed along the length (or width) of the substrate as the aperture(s) or substrate(s) are moved along a linear path).

Figure 7:
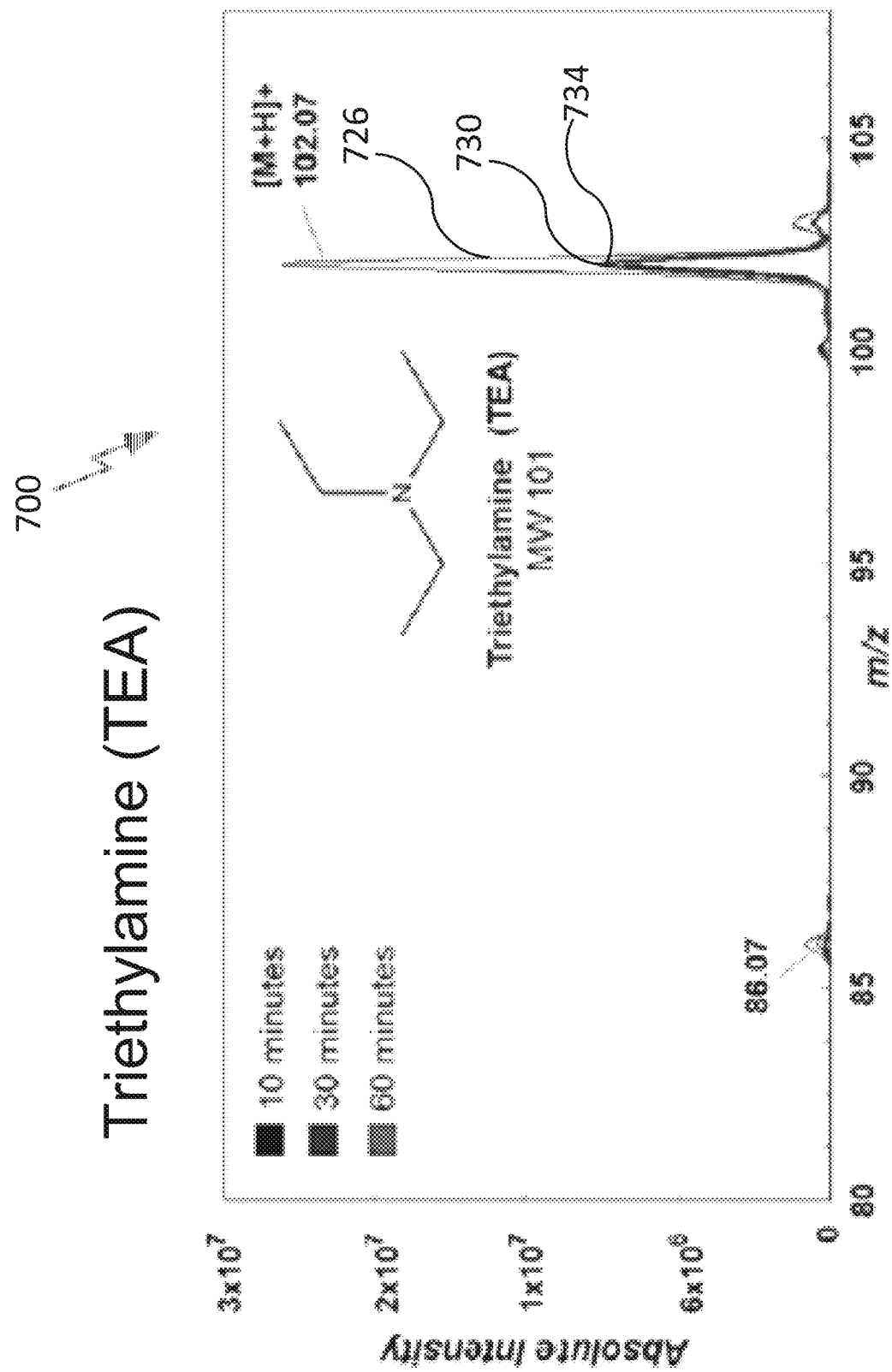
FIG. 7 is a graph of the absolute intensity readings from a mass spectrometer of molecules captured on a Teslin substrate exposed to an environment containing trimethylamine (TEA)

Referring to FIG. 7, a graph of the absolute intensity readings from a mass spectrometer of molecules captured on a Teslin substrate exposed to an environment containing trimethylamine (TEA) over the course of one hour is shown and designated 700. Graph 700 includes readings taken at 10 minutes, 30 minutes, and 60 minutes on the Teslin substrates. Peaks 726, 730, and 734 show the presence of TEA at 60 minutes, 30 minutes, and 10 minutes, respectively.

Figure 8:
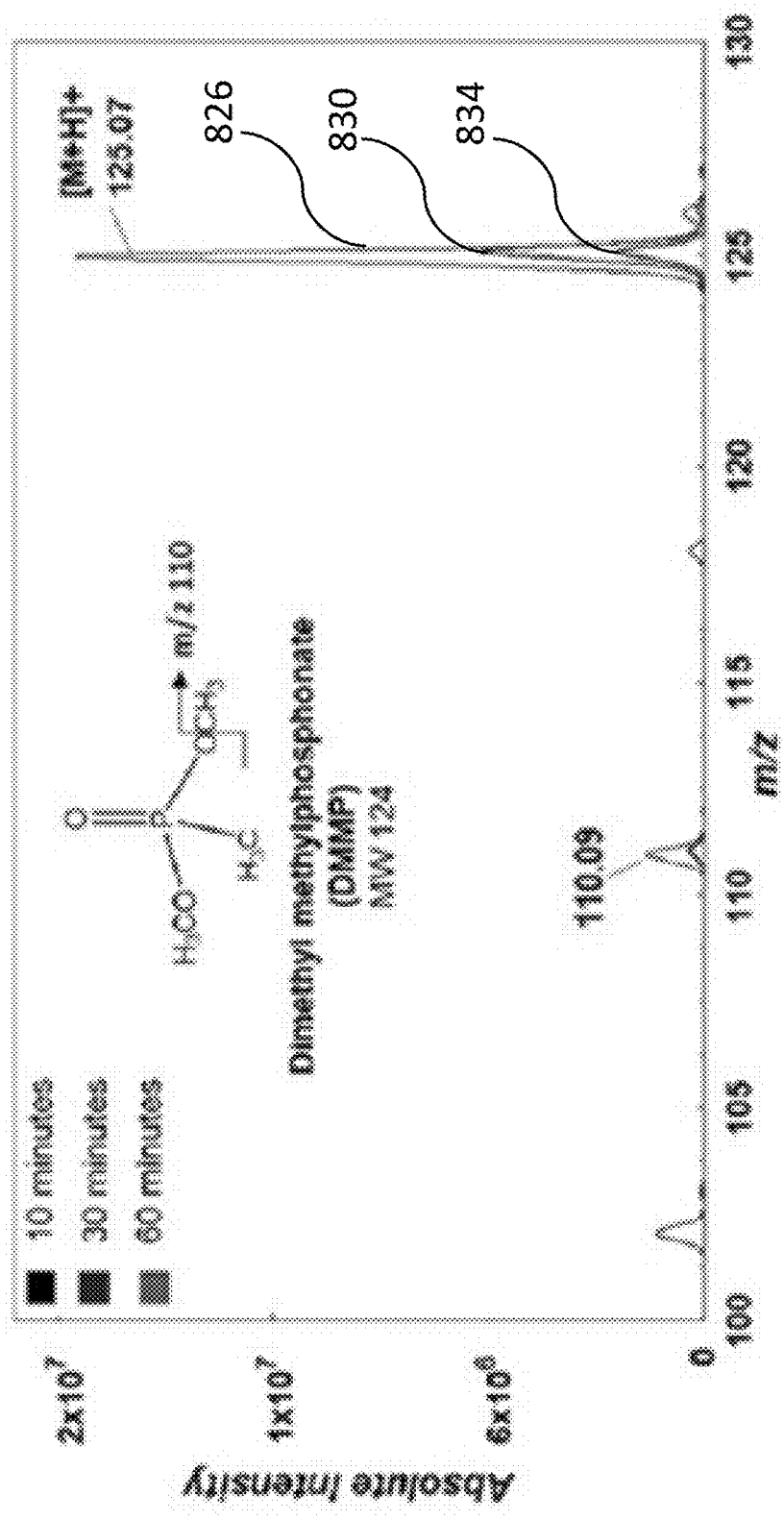
FIG. 8 is a graph of the absolute intensity readings from a mass spectrometer of molecules captured on Teslin substrate exposed to an environment containing dimethyl methylphosphonate (DMMP)

Referring to FIG. 8, a graph of the absolute intensity readings from a mass spectrometer of molecules captured on Teslin substrate exposed to an environment containing dimethyl methylphosphonate (DMMP) over the course of one hour is shown and designated 800. Graph 800 includes readings taken at 10 minutes, 30 minutes, and 60 minutes on the Teslin substrates. Peaks 826, 830, and 834 show the presence of DMMP at 60 minutes, 30 minutes, and 10 minutes, respectively.

Figure 9:
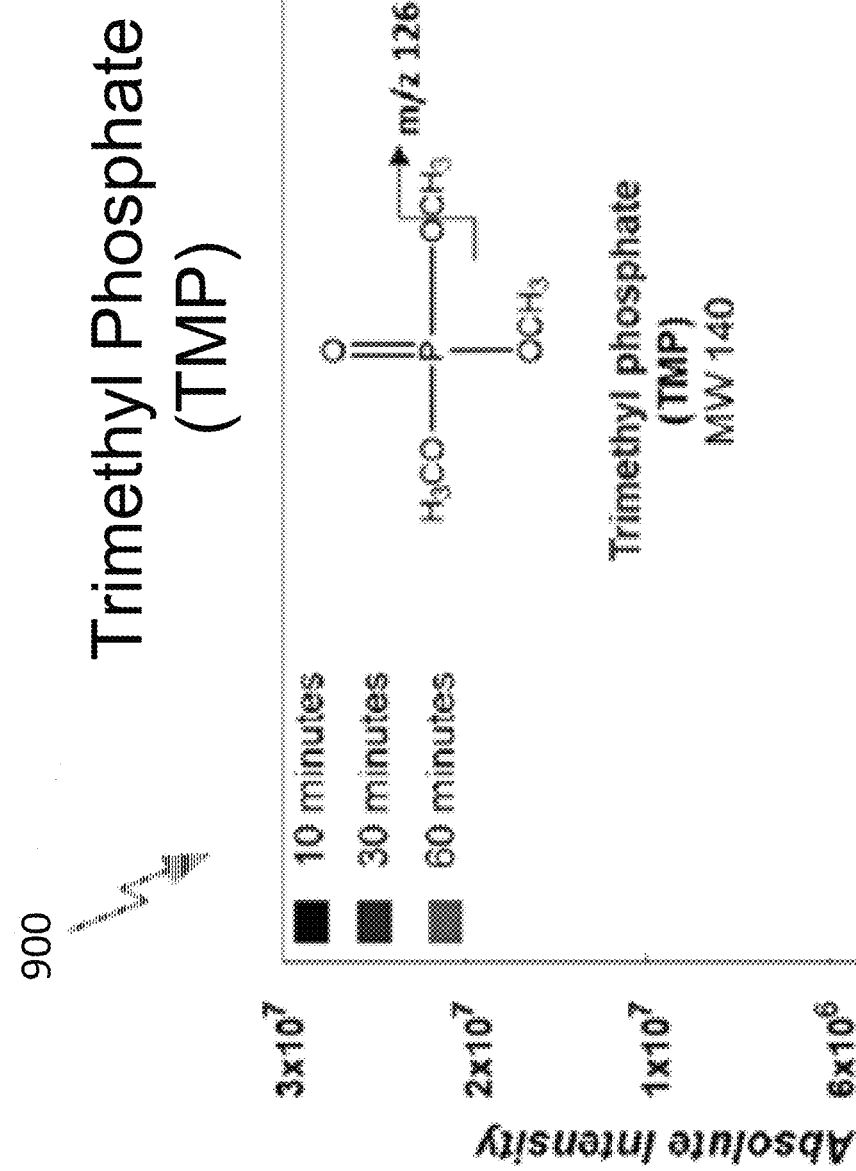
FIG. 9 is a graph of the absolute intensity readings from a mass spectrometer of molecules captured on Teslin substrate exposed to an environment containing trimethyl phosphate (TMP)

Referring to FIG. 9, a graph of the absolute intensity readings from a mass spectrometer of molecules captured on Teslin substrate exposed to an environment containing trimethyl phosphate (TMP) over the course of one hour is shown and designated 900. Graph 900 includes readings taken at 10 minutes, 30 minutes, and 60 minutes on the Teslin substrates. Peaks 926, 930, and 934 show the presence of TMP at 60 minutes, 30 minutes, and 10 minutes, respectively.

Figure 10:
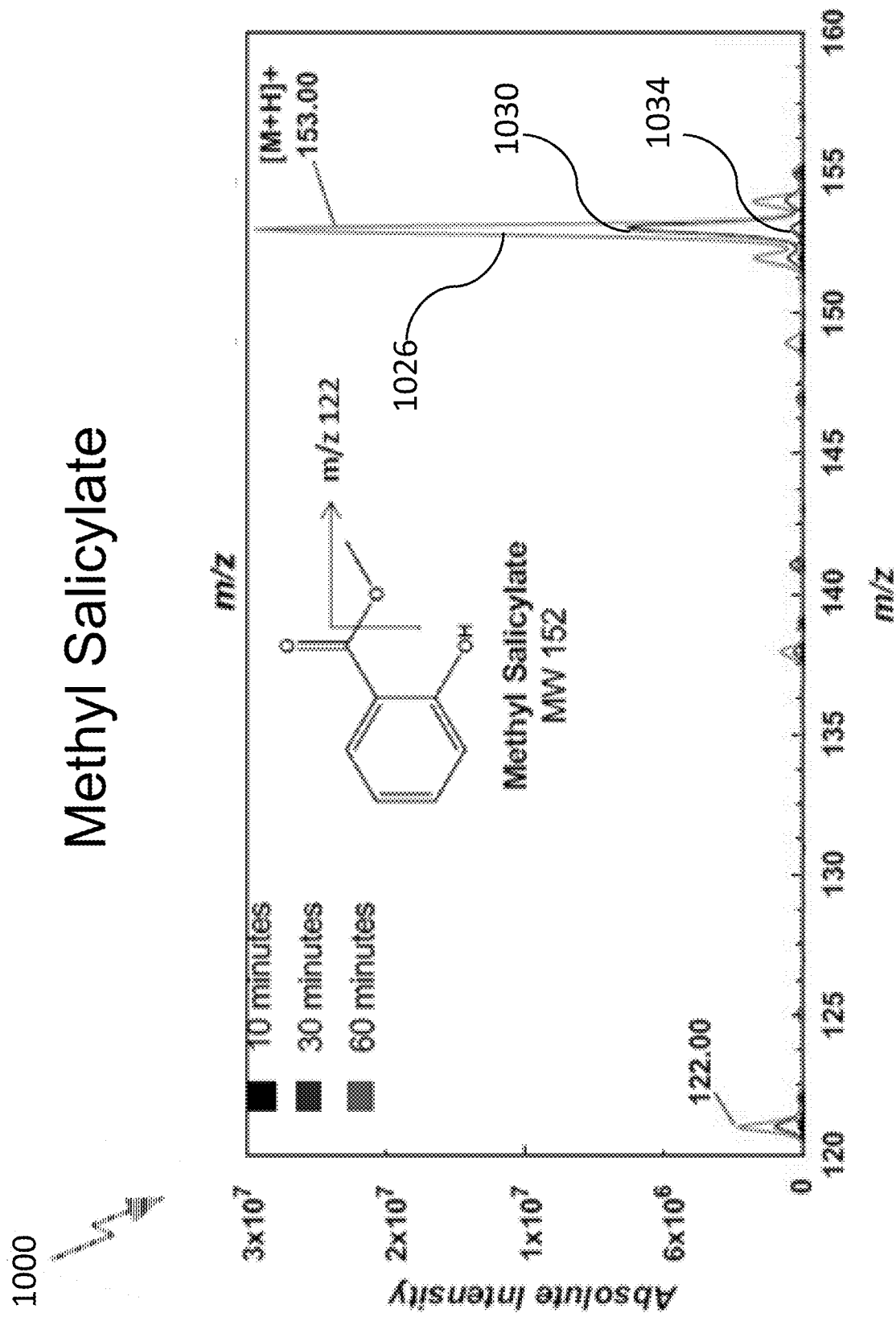
FIG. 10 is a graph of the absolute intensity readings from a mass spectrometer of molecules captured on Teslin substrate exposed to an environment containing methyl salicylate.

Referring to FIG. 10, a graph of the absolute intensity readings from a mass spectrometer of molecules captured on Teslin substrate exposed to an environment containing methyl salicylate over the course of one hour is shown and designated 1000. Graph 1000 includes readings taken at 10 minutes, 30 minutes, and 60 minutes on the Teslin substrates. Peaks 1026, 1030, and 1034 show the presence of methyl salicylate at 60 minutes, 30 minutes, and 10 minutes, respectively.

Figure 11:
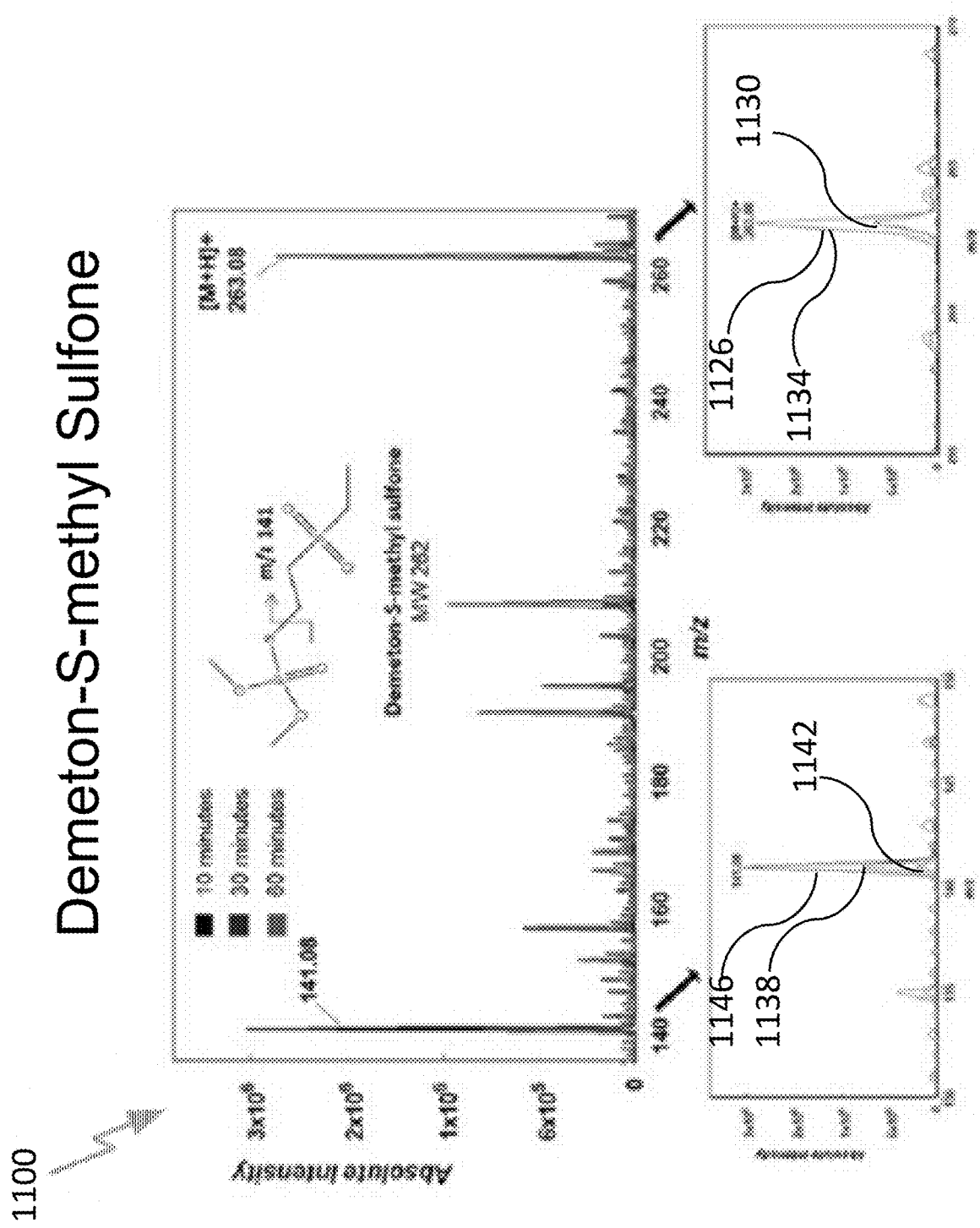
FIG. 11 is a graph of the absolute intensity readings from a mass spectrometer of molecules captured on Teslin substrate exposed to an environment containing demeton-S-methyl sulfone.

Referring to FIG. 11, a graph of the absolute intensity readings from a mass spectrometer of molecules captured on Teslin substrate exposed to an environment containing demeton-S-methyl sulfone over the course of one hour is shown and designated 1100. Graph 1100 includes readings taken at 10 minutes, 30 minutes, and 60 minutes on the Teslin substrates, and includes peaks at two major mass per ion (m/z) values: 141.08 and 263.08, signifying the presence of demeton-S-methyl sulfone. In order to see the peaks better, each respective peak is magnified below. The peaks at 141.08 are peaks 1138, 1142, and 1146, which show the presence of demeton-S-methyl sulfone at 60 minutes, 30 minutes, and 10 minutes, respectively. The peaks at 263.08 are peaks 1126, 1130, and 1134, which show the presence of demeton-S-methyl sulfone at 60 minutes, 30 minutes, and 10 minutes, respectively.

Figure 12:
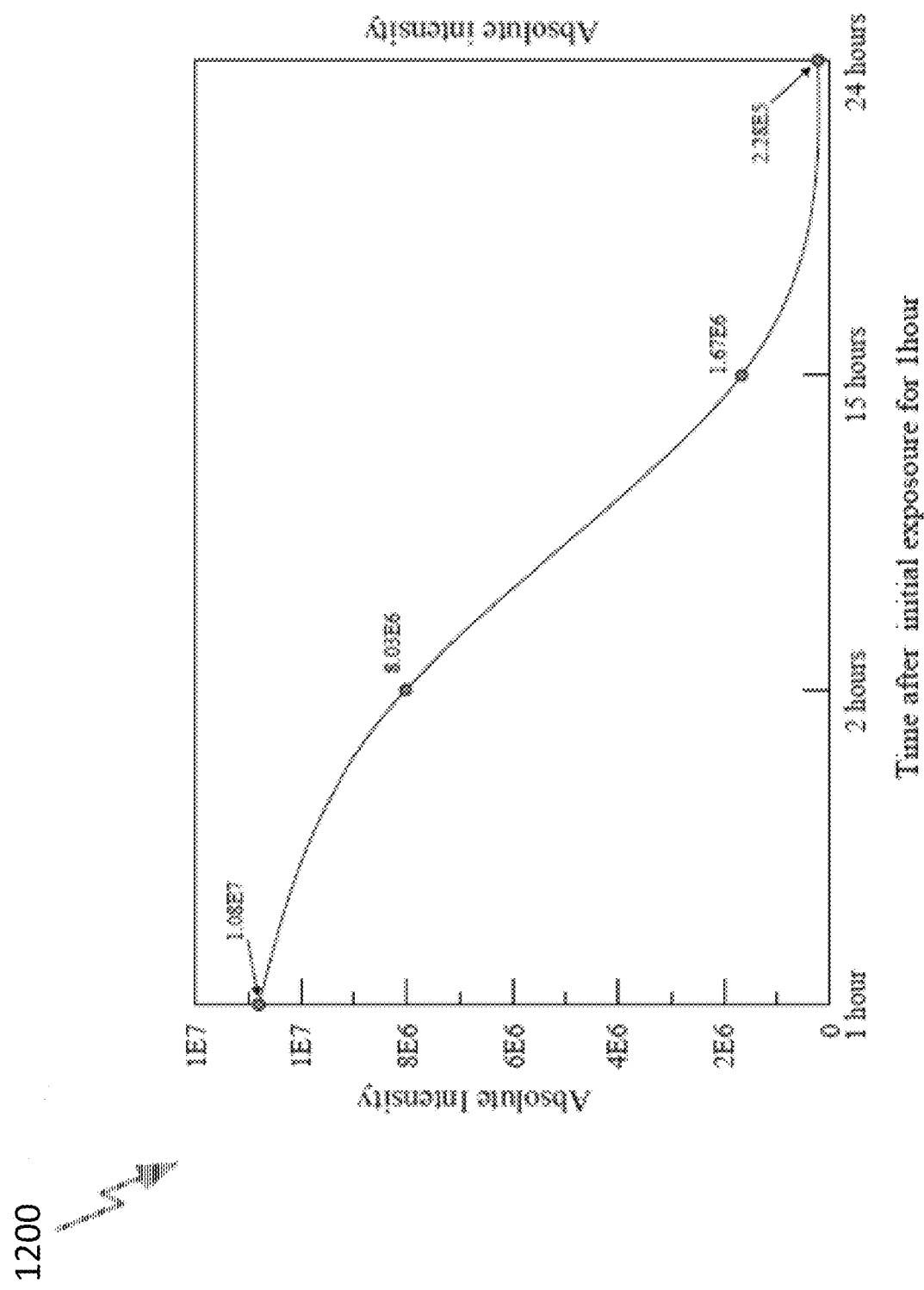
FIG. 12 is a graph of the absolute intensity readings from a mass spectrometer of molecules captured on a Teslin substrate.

Referring to FIG. 12, a graph of the absolute intensity readings from a mass spectrometer of molecules captured on a Teslin substrate exposed to an environment for one hour, stored over the course of 24 hours is shown and designated 1200. Graph 1200 illustrates the stability of a chemical captured on a Teslin substrate during storage.

Figure 13:
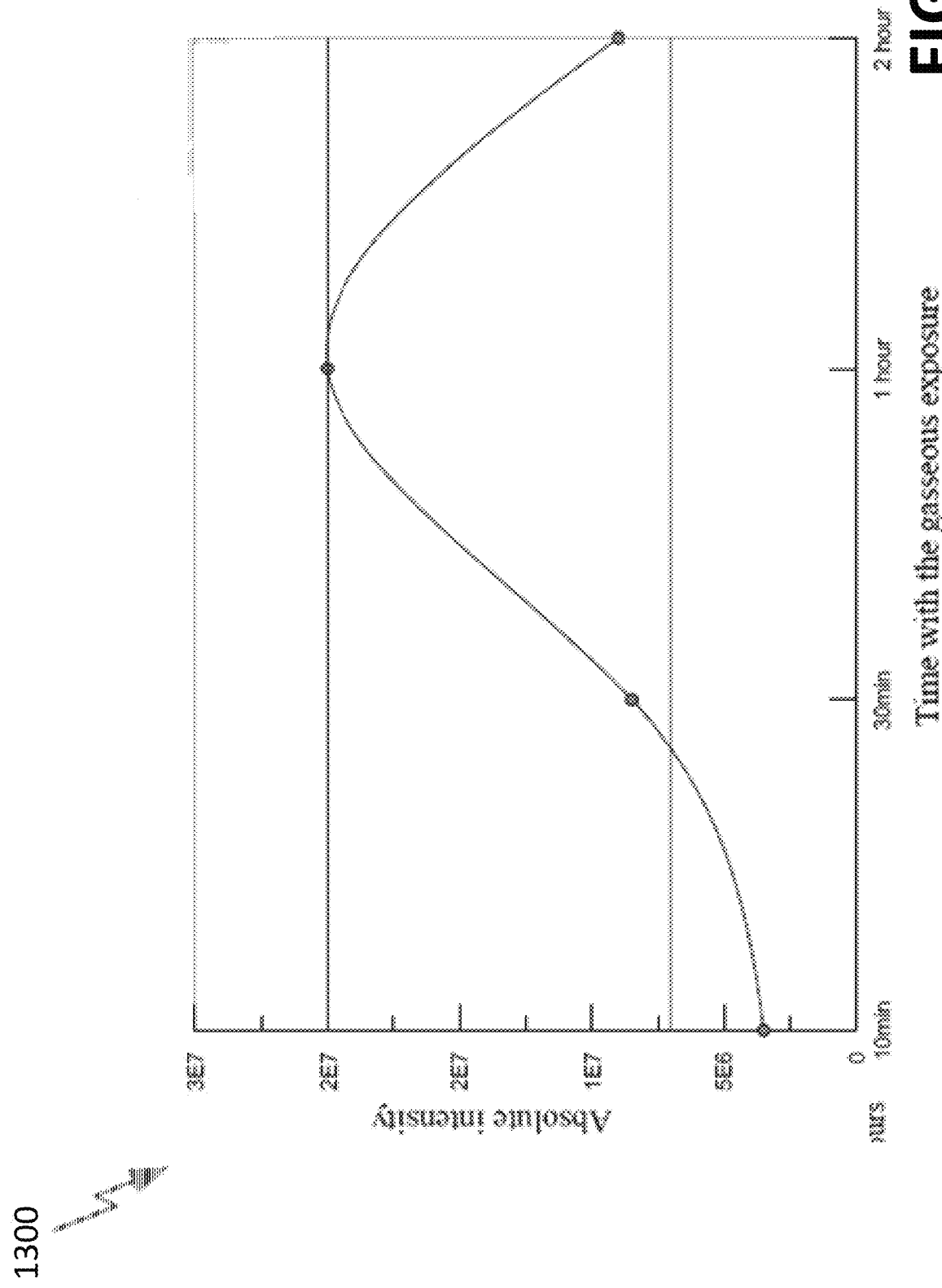
FIG. 13 is a graph of the absolute intensity readings from a mass spectrometer of molecules captured on a Teslin substrate exposed to an environment.

Referring to FIG. 13, a graph of the absolute intensity readings from a mass spectrometer of molecules captured on a Teslin substrate exposed to an environment over the course of two hours is shown and designated 1300. Graph 1300 illustrates the capturing efficiency over time of the Teslin substrate. Readings were taken at 10 minutes, 30 minutes, 1 hour, and 2 hours exposure to the environment.

Figure 14:
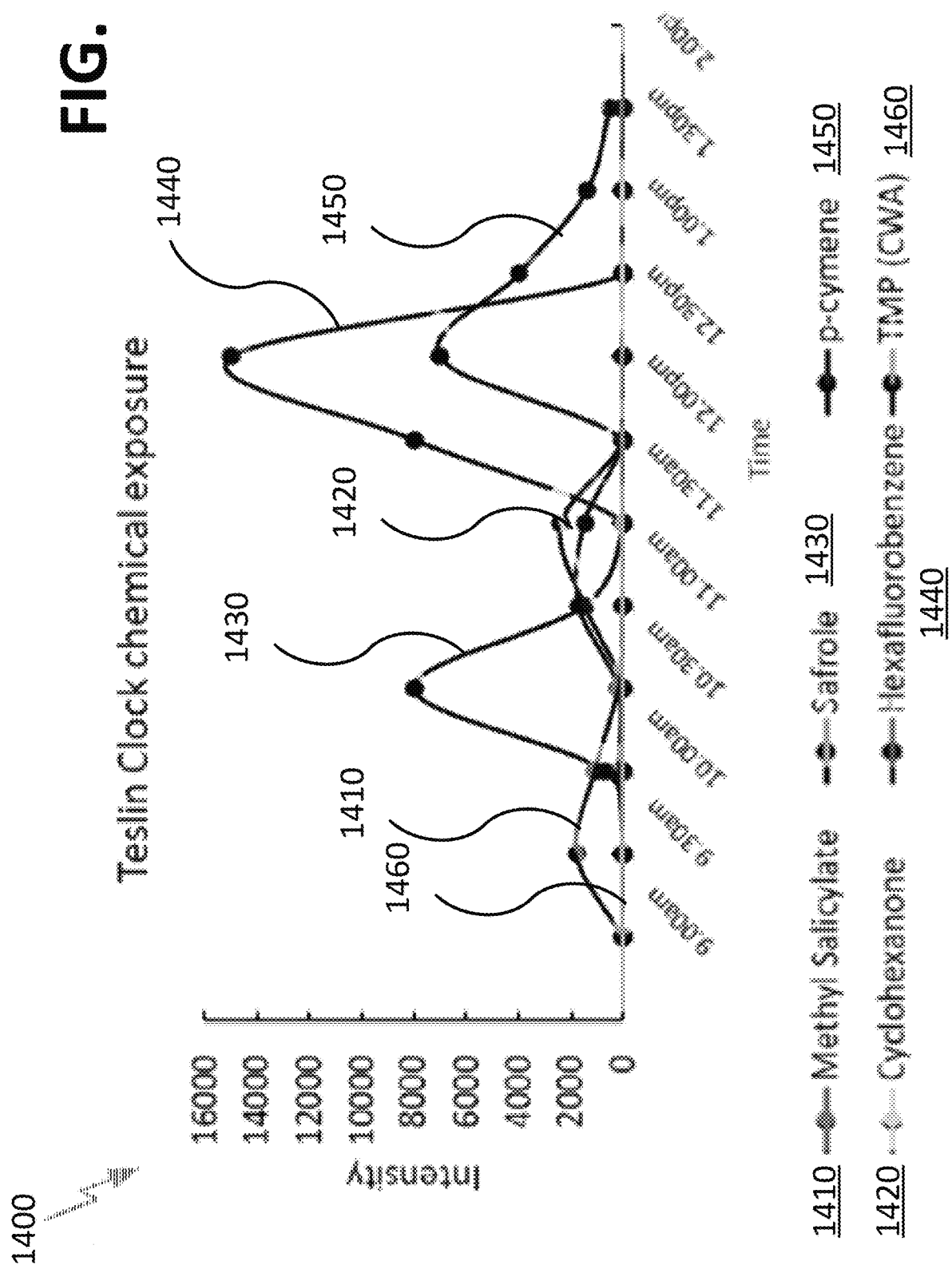
FIG. 14 is a graph of the absolute intensity readings from a mass spectrometer of molecules captured on a sheet of a Teslin substrate exposed to an environment.

Referring to FIG. 14, a graph of the absolute intensity readings from a mass spectrometer of molecules captured on a Teslin substrate exposed to an environment over the course of five hours is shown and designated 1400. In particular, graph 1400 shows plots 1410, 1420, 1430, 1440, 1450, 1460 correspond to methyl salicylate, cyclohexanone, safrole, hexafluorobenzene, p-cymene, and TMP (CWA), respectively. Graph 1400 illustrates the ability to capture and determine variances in captured molecule concentrations or intensities at different time intervals on a single Teslin substrate.

Figure 15:
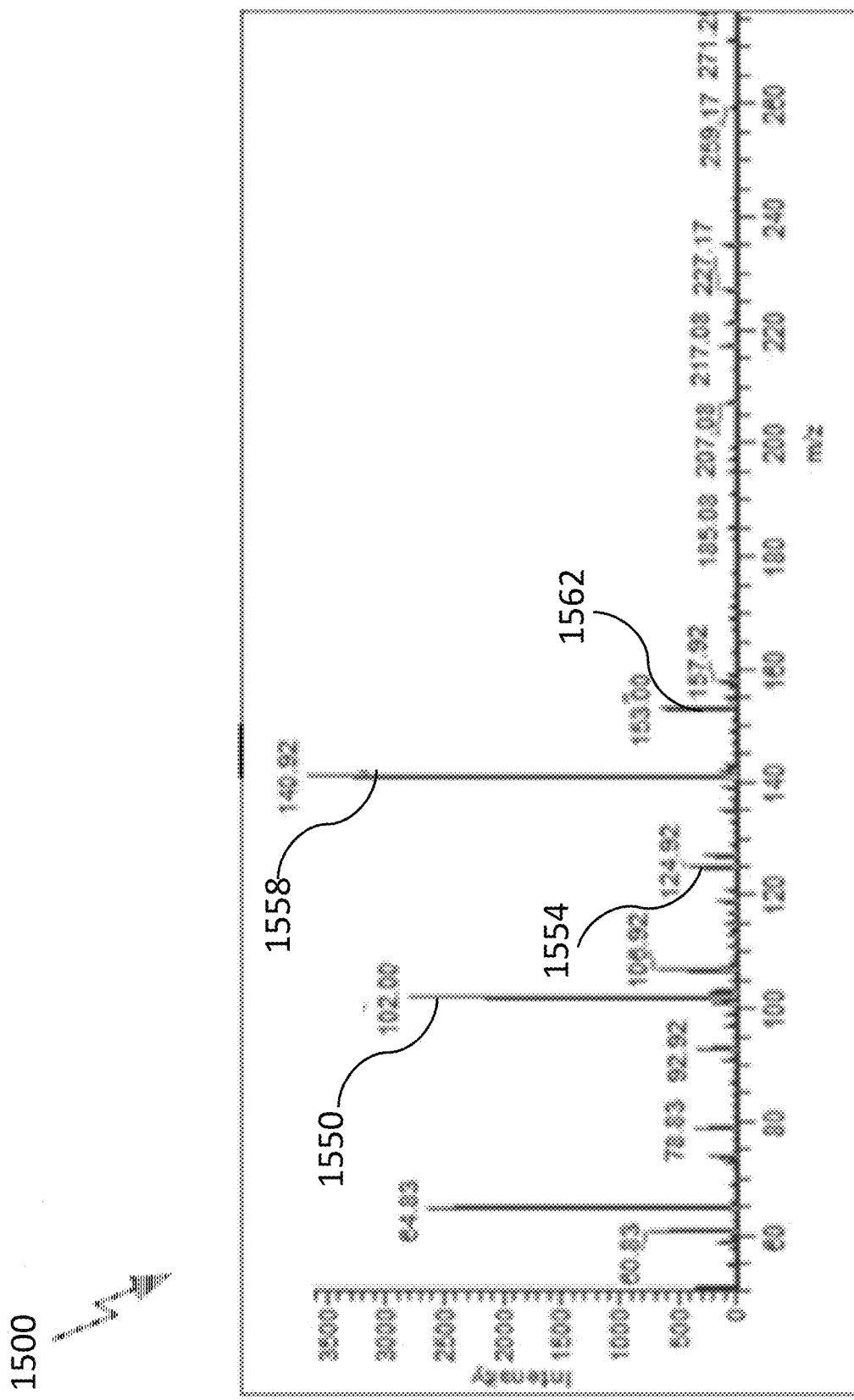
FIG. 15 is a graph of the absolute intensity readings from a mass spectrometer of molecules captured on a Teslin substrate exposed to an environment.

Referring to FIG. 15, a graph of the absolute intensity readings from a mass spectrometer of molecules captured on a Teslin substrate exposed to an environment is shown and designated 1500. Graph 1500 illustrates the presence of chemical warfare agents including TEA, DMMP, TMP, and methyl salicylate. Peak 1550 illustrates the presence of TEA, peak 1554 illustrates the presence of DMMP, peak 1558 illustrates the presence of TMP, and peak 1562 illustrates the presence of methyl salicylate.

As shown in FIGS. 5-15, utilization of Teslin substrates in accordance with aspects of the present disclosure enables the presence of molecules to be collected and analyzed over different periods of time while incurring less noise than would otherwise be experienced using paper substrates (e.g., FIG. 5). This enables identification of molecules present in an environment to be performed more accurately than previous systems and represents an improvement to devices used to collect samples of molecules from an ambient environment. Moreover, due to the reduced noise, shorter exposure times may be utilized, thereby enabling more rapid detection of molecules within an environment than would be possible with the noisy substrates used previously (e.g., as in FIG. 5).

Figure 16:
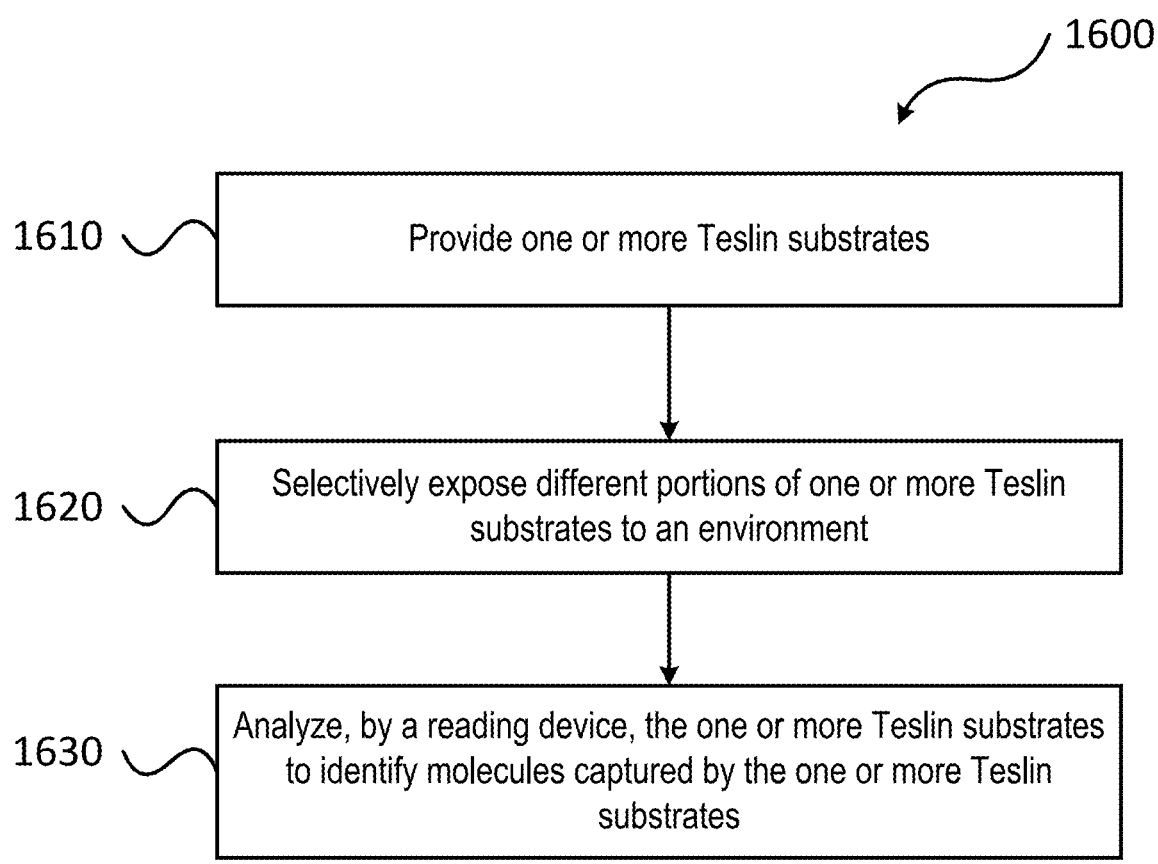
FIG. 16 is a flow diagram of a method for detecting molecules present in an environment in accordance with aspects of the present disclosure.

Referring to FIG. 16, a flow diagram of a method for detecting molecules present in an environment in accordance with aspects of the present disclosure is shown as a method 1600. In aspects, the method 1600 may be performed by a molecule collection device or system, such as the molecule collection devices and systems illustrated and described with reference to FIGS. 1-4. Steps of the method 1600 may be stored as instructions (e.g., at the memory 112 of FIG. 1) that, when executed by one or more processors (e.g., the one or more processors 110 of FIG. 1), cause the one or more processors to perform the method 1600.

At step 1610, the method 1600 includes providing one or more Teslin substrates. As described above with reference to FIGS. 5 and 6, utilizing Teslin substrates may eliminate noise that would otherwise be experienced. At step 1620, the method 1600 includes selectively exposing different portions of one or more Teslin substrates to an environment. Molecules present in the environment may be captured by the different portions of the one or more Teslin substrates as the different portions of the one or more Teslin substrates are exposed to the ambient environment. In aspects, the selective exposure of the different portions of the one or more Teslin substrates may include moving one or more apertures to expose at least one portion of the one or more Teslin substrates. Additionally or alternatively, the selective exposure of the different portions of the one or more Teslin substrates may include moving one or more Teslin substrates relative to one or more apertures to expose at least one portion of the one or more Teslin substrates. In an aspect, the method 1600 may also include analyzing, by a reading device, the one or more Teslin substrates to identify molecules captured by the one or more Teslin substrates. The one or more reading devices may include a mass spectrometer, an infrared spectrometer, or other devices capable of analyzing the molecules captured by the one or more Teslin substrates.

Exemplary molecules that may be captured, analyzed, and identified by the molecule collection devices and systems of embodiments may include volatile organic compounds, such as molecules associated clandestine activities (e.g., bomb making, manufacture of illegal drugs, and the like), molecules associated with use of illegal drugs (e.g., molecules associated with marijuana, methamphetamines, etc.), molecules associated with viruses (e.g., COVID-19, etc.), or other types of molecules. Moreover, it is noted that the use of Teslin substrates enables the molecule collection devices to be tuned to capture specific molecules of interest, thereby eliminating capture of significant amounts of noise due to the presence of molecules that are not of interest. This capability allows the molecule collection devices to be developed for specific use cases and to be operated in a manner that minimizes the number of false positives and interference experienced by the system, as well as enable more rapid identification of molecules (e.g., lower exposure times may be utilized to sample an environment).

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

It is noted that numerous specific details have been described above, such as examples of chemical effluents, apertures, motors, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. The phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for detecting one or more chemical effluents in an environment, the system comprising:
    one or more Teslin® substrates configured to capture molecules present in an environment;
    a housing comprising a plurality of surfaces, wherein the one or more Teslin® substrates are disposed within the housing; and
    means for selectively exposing different portions of the one or more Teslin® substrates to the environment, wherein the molecules present in the environment are captured by the different portions of the one or more Teslin® substrates as the different portions of the one or more Teslin® substrates are exposed.

2. The system of claim 1, further comprising one or more apertures disposed on a surface of the housing.

3. The system of claim 2, further comprising a fan configured to direct an air flow within the environment towards the one or more apertures.

4. The system of claim 2, wherein the means for selectively exposing the different portions of the one or more Teslin® substrates to the environment is configured to move the surface of the housing relative to the one or more Teslin® substrates to expose the different portions of the one or more Teslin® substrates to the environment via the one or more apertures disposed on the surface of the housing.

5. The system of claim 4, wherein the means for selectively exposing the different portions of the one or more Teslin® substrates to the environment comprises a motor configured to move the surface of the housing on which the one or more apertures are disposed to expose the different portions of the one or more Teslin® substrates to the environment.

6. The system of claim 5, wherein the motor is configured to rotate the surface of the housing to expose the different portions of the one or more Teslin® substrates to the environment.

7. The system of claim 2, wherein the means for selectively exposing the different portions of the one or more Teslin® substrates to the environment is configured to move the one or more Teslin® substrates relative to the one or more apertures to expose the different portions of the one or more Teslin® substrates to the environment via the one or more apertures.

8. The system of claim 7, wherein the means for selectively exposing the different portions of the one or more Teslin® substrates to the environment comprises a motor configured to move the one or more Teslin® substrates relative to the one or more apertures to expose the different portions of the one or more Teslin® substrates to the environment.

9. The system of claim 8, wherein the motor is configured to rotate the one or more Teslin® substrates to expose the different portions of the one or more Teslin® substrates to the environment.

10. The system of claim 1, further comprising a vehicle, wherein the vehicle is a car, truck, van, bicycle, motorcycle, train, bus, boat, submarine, helicopter, airplane, drone, quadcopter, or hot air balloon.

11. The system of claim 1, wherein the means for selectively exposing different portions of the one or more Teslin® substrates to the environment is configured to incrementally expose the different portions of the one or more Teslin® substrates to the environment, wherein a first increment exposes a first portion of the one or more Teslin® substrates to the environment and a second increment exposes a second portion of the one or more Teslin® substrates to the environment.

12. The system of claim 1, wherein the one or more Teslin® substrates are tunable to capture different molecules.

13. The system of claim 1, further comprising a reading device configured to:
analyze the one or more Teslin® substrates;
identify molecules of interest captured by the one or more Teslin® substrates; and
provide a report of the identified molecules.

14. The system of claim 13, wherein the reading device is a mass spectrometer or an infrared spectrometer.

15. A method for detecting one or more chemical effluents in an environment, the method comprising:
providing one or more Teslin® substrates; and
selectively exposing different portions of the one or more Teslin® substrates to an environment, wherein molecules present in the environment are captured by the different portions of the one or more Teslin® substrates as the portions of the one or more Teslin® substrates are exposed to the environment.

16. The method of claim 15, wherein the one or more Teslin® substrates are disposed in a housing comprising a plurality of surfaces, wherein one or more apertures are present on at least one of the plurality of surfaces, and wherein selectively exposing the different portions of the one or more Teslin® substrates to an environment comprises:
moving the one or more apertures to expose at least one portion of the one or more Teslin® substrates to the environment.

17. The method of claim 15, wherein the one or more Teslin® substrates are disposed in a housing comprising a plurality of surfaces, wherein the one or more apertures are present on at least one of the plurality of surfaces, and wherein selectively exposing the different portions of the one or more Teslin® substrates to an environment comprises:
moving the one or more Teslin® substrates relative to the one or more apertures to expose at least one portion of the one or more Teslin® substrates to the environment.

18. The method of claim 15, further comprising analyzing, by a reading device, the one or more Teslin® substrates to identify molecules captured by the one or more Teslin® substrates.

19. A non-transitory computer-readable medium storing instructions that, when executed by one or more processors, cause the one or more processors to perform operations for capturing molecules present in an environment, the operations comprising:
controlling exposure of one or more Teslin® substrates to an environment such that different portions of the one or more Teslin® substrates are exposed to the environment over time, wherein the one or more Teslin® substrates are disposed in a housing comprising a plurality of surfaces, wherein one or more apertures are present on at least one of the plurality of surfaces, and wherein the one or more Teslin® substrates are exposed to the environment via the one or more apertures;
analyzing the one or more Teslin® substrates to identify molecules captured by the one or more Teslin® substrates; and
generating an output comprising information associated with the identified molecules.

20. The non-transitory computer-readable medium of claim 19, wherein controlling exposure of the one or more Teslin® substrates to the environment comprises moving the one or more apertures relative to the one or more Teslin® substrates or moving the one or more Teslin® substrates relative to the one or more apertures.

* * * * *